United States Patent [19]
Elberbaum et al.

[11] Patent Number: 5,293,231
[45] Date of Patent: Mar. 8, 1994

[54] APPARATUS FOR SYNCHRONIZING TERMINAL EQUIPMENT

[75] Inventors: David Elberbaum, Tokyo; Yoshio Kaneta, Machida, both of Japan

[73] Assignee: Elbex Video, Ltd., Tokyo, Japan

[21] Appl. No.: 48,079

[22] Filed: Apr. 15, 1993

Related U.S. Application Data

[63] Continuation of Ser. No. 788,987, Nov. 7, 1991, abandoned.

[51] Int. Cl.$^5$ .............................................. H04N 5/04
[52] U.S. Cl. ...................................... 348/521; 348/500
[58] Field of Search ................. 358/149, 148, 150, 19, 358/17, 158; H04N 5/04

[56] References Cited

U.S. PATENT DOCUMENTS

| | | | |
|---|---|---|---|
| 3,435,141 | 3/1969 | Hileman et al. | 358/149 |
| 3,443,024 | 5/1969 | Allen et al. | 358/149 |
| 4,232,339 | 11/1980 | Smiley et al. | 358/149 |

FOREIGN PATENT DOCUMENTS 2105150  3/1983  United Kingdom ................ 358/148

Primary Examiner—James J. Groody
Assistant Examiner—David E. Harvey
Attorney, Agent, or Firm—Helfgott & Karas

[57] ABSTRACT

An apparatus for synchronizing a terminal equipment such as a TV camera includes an external synchronizing signal generator which includes a switching circuit which generates two frequency signals and alternately transmits these signals to the terminal equipment which is provided with a decoder circuit decoding an alternating rate of the two signals outputted from the synchronizing signal generator, and an internal synchronizing signal generating circuit receiving a decoder circuit and generating a new synchronizing signal on the basis of the decoded signal.

8 Claims, 2 Drawing Sheets

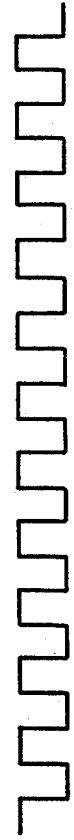
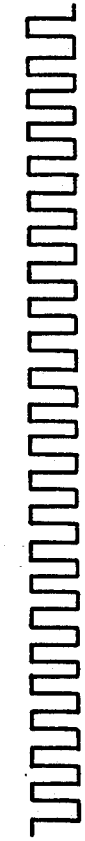
FIG. 2(A) ALTERNATING RATE SIGNAL
FIG. 2(B) FIRST LOW FREQUENCY SIGNAL
FIG. 2(C) SECOND LOW FREQUENCY SIGNAL
FIG. 2(D) OUTPUT SIGNAL
FIG. 2(E) DECODED SIGNAL
FIG. 2(F) TIMING SIGNAL

APPARATUS FOR SYNCHRONIZING TERMINAL EQUIPMENT

This is a continuation of application Ser. No. 788,987, filed Nov. 7, 1991, now abandoned.

BACKGROUND OF THE INVENTION

1. Field of the Invention

This invention relates to an apparatus for synchronizing a terminal equipment, by using an external synchronizing signal, and more particularly, to a synchronizing apparatus suitable for a television camera having means for generating a horizontal synchronizing signal and a vertical synchronizing signal or composite synchronizing signal.

2. Description of the Prior Art

In a monitor television system used as one of information transmission systems, at least one television monitor is connected to a plurality of television cameras through an electronic switch and a plurality of transmission lines. The electronic switch provides selection of any one of the television cameras or sequential switching and displaying on the television monitor a picture image of one camera after another.

In such an information transmission system, it is necessary to mutually lock the internal synchronizing signals of a plurality of television cameras to an external synchronizing signal, in order to prevent the picture image on the monitor from being disturbed during and immediately after the switching operation from one television camera to another.

As one of the devices for synchronizing a plurality of television cameras, there is known an apparatus for transmitting a horizontal synchronizing signal and a vertical synchronizing signal used in a television system from an external synchronizing generator to the television cameras, and driving the television camera by the transmitted horizontal synchronizing signal, and the vertical synchronizing signal, or the composite synchronizing signal.

Another known apparatus for synchronizing a plurality of television cameras, is an apparatus for transmitting an external synchronizing signal from an external synchronizing generator to the television cameras and locking an internal synchronizing signal generator of the television camera by means of the transmitted external synchronizing signal. Such an apparatus is disclosed in U.S. Pat. No. 4,603,352, the contents of which are incorporated herein by reference.

In any of the known devices of the type under discussion, as the transmitted synchronizing signal itself is a train of pulses, which can be easily influenced by noise, the transmission of a synchronizing signal requires the use of a coaxial cable with its high shielding effect, which makes it difficult to transmit the synchronizing signal over long distances.

SUMMARY OF THE INVENTION

It is therefore an object of the present invention to provide an apparatus for synchronizing a terminal equipment, wherein an external synchronizing signal may be transmitted through a cheap transmission line over long distances without being influenced by noise.

The apparatus is intended for synchronizing a terminal equipment by transmitting a synchronizing signal generated by an external synchronizing signal generator to the terminal equipment.

The synchronizing apparatus according to the present invention comprises first processing means disposed in the external synchronizing signal generator and second processing means disposed in the terminal equipment. The first processing means generates two or more frequency signals having frequencies higher than that of the synchronizing signal and different from each other and alternately transmits the two or more frequency signals to the terminal equipment. The second processing means, in turn, receives the two or more frequency signals transmitted from the external synchronizing signal generator, decodes the signal in accordance with the alternating rate of the received two frequency signals, and generates a new synchronizing signal on the basis of the decoded signal.

The two or more frequency signals are alternately transmitted, as a synchronizing signal, from the first processing means to the terminal equipment through a cable means. The second processing means generates the new synchronizing signal synchronized with the signal corresponding to the timing of the switching of the two alternating frequency signals, and synchronizes the terminal equipment by the generated new synchronizing signal. As a result, the terminal equipment is synchronized by the two or more frequency signals alternately transmitted from the first processing means.

According to the present invention, the two or more frequency signals are less liable to receive any influence of noise because at least two predetermined frequency signals are alternately transmitted from the first processing means to the terminal equipment. Therefore, it is not necessary to use an expensive coaxial cable as a transmission line as has been the case in a conventional equipment, and the two or more frequency signals can be transmitted over long distances by using an inexpensive transmission line, such as a twisted pair of wires.

It is preferable to assign for the two or more frequency signals, low-frequency signals below 30 KHz, and in case of using a telephone circuit, it is preferable that they are within the frequency band of an audio signal, in particular, about 300 Hz to 5,000 Hz.

Assuming that the frequency of the synchronizing signal is f0, the frequencies of the two frequency signals are respectively f1 and f2, n1 and n2 are respectively random integers equal to or larger than 1, it is preferable that the frequencies f1 and f2 are respectively defined as $f0 \times 2^{n1}$ and $f1 \times 2^{n2}$. By this procedure, the two frequency signals can be generated by utilizing a digital circuit.

In case the terminal equipment is a television camera, it is preferable that the synchronizing signal is a horizontal, vertical or composite synchronizing signal transmitted in a television system, in particular, a vertical synchronizing signal.

When the terminal equipment is a television camera it is preferable that the first processing means include a circuit for generating a clock signal having a constant frequency which is an integer multiple of the two or more frequency signals, a divider circuit for dividing the clock signal so as to generate two or more frequency signals, a switching circuit for alternately switching the two or more frequency signals by using a switching signal having a frequency which is an integer part of the clock signal and which is an integer part of the frequencies of the first frequency signal, and an output circuit for receiving a switching signal from the switching circuit and transmitting the switching signal to the television camera. The second processing means may include a decoder circuit for decoding a signal corresponding to the switching signal on the basis of the two or more received frequency signals, and a circuit for generating a new synchronizing signal on the basis of the decoded signal.

It is preferable that the switching signal is a square wave signal having a duty cycle of 50%.

The present invention is applied not only to synchronizing a single terminal equipment but also to synchronizing a plurality of terminal equipments, in particular, a plurality of television cameras.

BRIEF DESCRIPTION OF THE DRAWINGS

The foregoing and other objects and features of the invention will become apparent from the following description of a preferred embodiment of the invention with reference to the accompanying drawings, in which:

FIG. 2A-2F are waveform diagram showing the waveform of an electric signal processed in the apparatus of the present invention.

DETAILED DESCRIPTION OF THE PREFERRED EMBODIMENT

Figure 1:
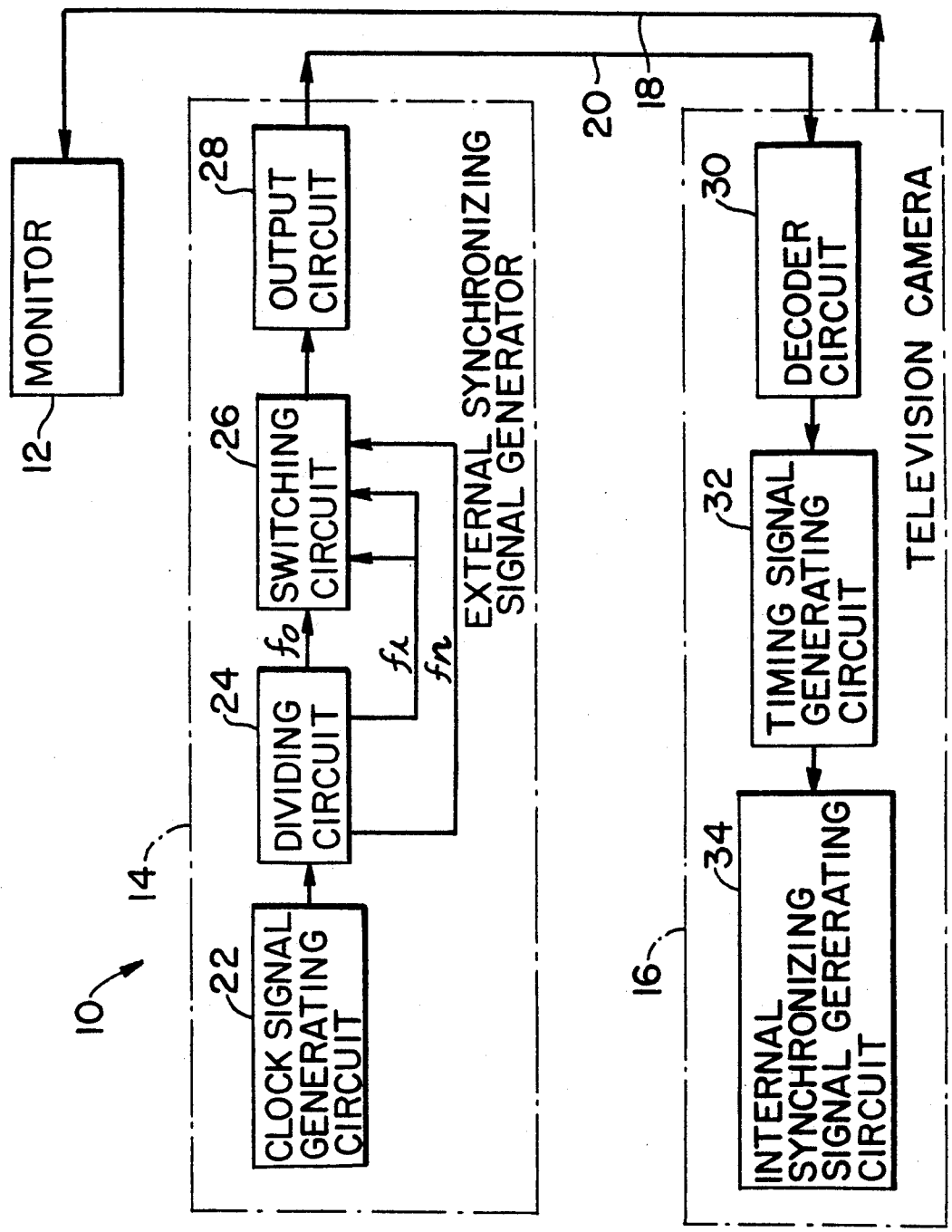
FIG. 1 is a block diagram of a preferred embodiment of the apparatus of the present invention.

FIG. 1 shows a synchronizing apparatus 10 comprising a television monitor 12, an external synchronizing signal generator 14 placed in the vicinity of the monitor 12, and a television camera 16 acting as a terminal equipment. The television camera 16 is connected to the monitor 12 by a cable 18 and to the external synchronizing signal generator 14 by another cable 20. However, the television camera 16 may be connected to the monitor 12 and the external synchronizing signal generator 16 through a common cable.

The external synchronizing signal generator 14 comprises a clock signal generating circuit 22 of the well-known type for generating a clock signal having a constant frequency, a dividing circuit 24 receiving the clock signal from the clock signal generating circuit and dividing the same so as to generate a switching or alternating rate signal (shown in FIG. 2A) and first and second low-frequency signals (shown in FIGS. 2B and 2C, respectively), a switching circuit 26 receiving the switching signal and the first and second low-frequency signals from the dividing circuit 24 and outputting by repeatedly switching the received first and second low-frequency signals using the received switching signal, and an output circuit 28 receiving the output signal (FIG. 2D) from the switching circuit 26 and transmitting the same to the television camera 16 through the cable 20.

The television camera 16 comprises a decoder circuit 30 for receiving the first and second low-frequency signals as output signals from cable 20 and decoding, or demodulating, these signals (FIG. 2E) in accordance with the alternating rate of the first and second low-frequency signals. A timing signal generating circuit 32 of the televsion camera 16 is connected to decoder circuit 30 to receive a decoded alternating signal and to produce a waveform timing signal (FIG. 2F). An internal synchronizing signal generating circuit 34 is connected to the timing signal generating circuit 32 to receive the timing signal therefrom and generate an internal synchronizing signal synchronized with the received timing signal.

When the frequency of a vertical synchronizing signal of the television camera 16 is f0, the frequency of the alternating signal rate is f1, the frequencies of the first and second low-frequency signals are respectively f2 and f3, the frequency of the clock signal is f4, and n1, n2, n3 and n4 are the random integers equal to or larger than 1, their respective frequencies can be selected as follows:

$$f1 = f0 \div 2^{n1}$$

$$f2 = f1 \times 2^{n2}$$

$$f3 = f2 \times 2^{n3}$$

$$f4 = f3 \times 2^{n4}$$

However, the frequency f1 may be either f0 or $f0 \times 2^{2n1}$. The frequencies f1, f2, f3 and f4 may be any given values, preferably such that frequencies f2 and f3 are selected from values within the low-frequency range, in particular, within the frequency band of an audio signal, the frequency f1 is selected to be of a value lower than frequencies f2 and f3, and that frequencies f2 and f3 are selected from values lower than frequency f4.

For instance, in case of NTSC system, the vertical synchronizing signal is 60 Hz. Therefore, the respective frequencies are set as follows:

f1 = 30 Hz
f2 = 960 Hz
f3 = 1,920 Hz

When the alternating rate signal shown in FIG. 2(A) and the first and second low-frequency signals respectively shown in FIGS. 2(B) and 2(C) are outputted from the dividing circuit 24, the output signal shown in FIG. 2(D) is outputted from the switching circuit 26. This signal is transmitted to the television camera 16 through output circuit 28 and cable 20.

As the first and second low-frequency signals have their frequencies of less than 30 KHz, the signal shown in FIG. 2(D) is not influenced by any noise. Therefore, the first and second low-frequency signals are transmitted through a cheap cable such as a twisted wire pair cable.

The television camera 16 decodes, or demodulates, the switching signal as shown in FIG. 2(E) in the decoder circuit 30, generates the timing signal as shown in FIG. 2(F) in the timing signal generating circuit 32 on the basis of the decoded signal, and generates the horizontal synchronizing signal and vertical synchronizing signal on the basis of the timing signal in the internal synchronizing signal generating circuit 34.

The television camera 16 is driven by the horizontal synchronizing signal and the vertical synchronizing signal synchronized by the signal transmitted from the synchronizing signal generator 14, and transmits a picture image signal to the monitor 12 through cable 18.

In case of the embodiment shown in the drawing, a single television camera 16 is controlled by the external synchronizing signal generator 14. However, the present invention is applied to an apparatus for controlling simultaneously or selectively a plurality of terminal equipments (television cameras) by the external synchronizing signal generator 14.

Furthermore, the present invention may be applied to an apparatus for synchronizing and controlling each television camera by the external synchronizing signal generator 14 by connecting the monitor 12 to a plurality of television cameras selectively by any suitable switching means. In such a case, the external synchronizing signal generator will be connected to a predetermined television camera while synchronizing will take place with the switching operation of the monitor as has been described in the aforementioned U.S. patent.

It should be noted that the parts of the television camera and the synchronizing signal generator which are known have not been described in detail herein because they are disclosed in the above patent.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. An apparatus for synchronizing one or more terminal equipment, comprising:

an external synchronizing signal generator generating at least two different frequency signals and an external synchronizing signal at a frequency different from said at least two frequency signals, and for alternately transmitting said at least two frequency signals at the frequency rate of said external synchronizing signal to said one or more terminal equipment through a transmission line;

first processing means disposed at said external synchronizing signal generator; and second processing means disposed at each of said one or more terminal equipment;

said first processing means generating said at least two frequency signals each having a frequency higher than a frequency of said external synchronizing signal, for transmission of said at least two frequency signals at an alternating rate of the frequency of said external synchronizing signal to each of said terminal equipment; and said second processing means receiving said alternating at least two frequency signals from said first processing means of said external synchronizing signal generator, decoding said alternating rate of said at least two frequency signals to produce a decoder signal having said alternating rate and applying the decoder signal to the terminal equipment in which it is located for synchronizing said terminal equipment to said external synchronizing signal.

2. An apparatus as claimed in claim 1, wherein the frequencies of said at least two frequency signals are, respectively, within a frequency band of an audio signal.

3. An apparatus as claimed in claim 1, wherein if the frequency of said external synchronizing signal is f0, the frequencies of said at least two frequency signals are, respectively, f1 and f2, and n1 and n2 are random integers equal to or larger than 1, f1 is defined as $f0 \times 2^{n1}$, and f2 is defined as $f1 \times 2^{n2}$.

4. An apparatus as claimed in claim 1, wherein said terminal equipment is a television camera, and said external synchronizing signal frequency is an horizontal synchronizing signal frequency or a vertical synchronizing signal frequency used in a television system.

5. An apparatus as claimed in claim 1, wherein said terminal equipment is a television camera, and said external synchronizing signal frequency is a composite synchronizing signal frequency used in a television system.

6. An apparatus as claimed in claim 4, wherein said first processing means includes:

a circuit for generating a clock signal having a constant frequency which is an integer multiple of said at least two frequency signals;

a divider circuit for dividing said clock signal so as to generate said at least two frequency signals;

a switching circuit for dividing said clock signal so as to generate said at least two frequency signals;

a switching circuit for outputting, by alternately switching, said two frequency signals using a switching signal having at least one switching frequency which is an integer part of said clock signal; and an output circuit for transmitting the switched signals to said television camera; and said second processing means includes:

a decoder circuit for decoding a signal received from said first processing means in accordance with said at least one switching frequency of the two received frequency signals; and a circuit for applying said decoder signal to said television camera for synchronizing said television camera to said switching signal.

7. An apparatus as claimed in claim 6, wherein said switching circuit produces a switching signal having a duty cycle of 50%.

8. An apparatus as claimed in claim 5, wherein said first processing means includes:

a circuit for generating a clock signal having a constant frequency which is an integer multiple of said at least two frequency signals;

a divider circuit for dividing said clock signal so as to generate said at least two frequency signals;

a switching circuit for outputting by alternately switching said two 1 signals using a switching signal having at least one switching frequency which is an integer part of said clock signal; and an output circuit for transmitting the switched signals to said television camera; and said second processing means includes:

a decoder circuit for decoding a signal received from said first processing means in accordance with said at least one switching frequency of the two received frequency signals; and a circuit for applying said decoder signal to said television camera to said switching signal.

* * * * *